(12) United States Patent
Chen

(10) Patent No.: US 10,133,260 B2
(45) Date of Patent: Nov. 20, 2018

(54) METHODS AND APPARATUSES FOR CUTTER PATH PLANNING AND FOR WORKPIECE MACHINING

(71) Applicant: SHENZHEN A&E INTELLIGENT TECHNOLOGY INSTITUTE CO., LTD, Shenzhen, Guangdong Province (CN)

(72) Inventor: Xiaoying Chen, Shenzhen (CN)

(73) Assignee: SHENZHEN A&E INTELLIGENT TECHNOLOGY INSTITUTE CO., LTD., Shenzhen, Guangdong Province (CN)

( * ) Notice: Subject to any disclaimer, the term of this patent is extended or adjusted under 35 U.S.C. 154(b) by 212 days.

(21) Appl. No.: 15/101,932

(22) PCT Filed: Dec. 5, 2014

(86) PCT No.: PCT/CN2014/093169
§ 371 (c)(1),
(2) Date: Jun. 6, 2016

(87) PCT Pub. No.: WO2015/081892
PCT Pub. Date: Jun. 11, 2015

(65) Prior Publication Data
US 2016/0306341 A1    Oct. 20, 2016

(30) Foreign Application Priority Data
Dec. 6, 2013   (CN) .......................... 2013 1 0661549

(51) Int. Cl.
G05B 19/00   (2006.01)
G05B 19/41   (2006.01)
G06F 17/16   (2006.01)

(52) U.S. Cl.
CPC ............. *G05B 19/41* (2013.01); *G06F 17/16* (2013.01); *G05B 2219/35121* (2013.01)

(58) Field of Classification Search
None
See application file for complete search history.

(56) References Cited

U.S. PATENT DOCUMENTS

| | | | |
|---|---|---|---|
| 6,447,223 B1 * | 9/2002 | Farah | G05B 19/41 318/570 |
| 2016/0224005 A1 * | 8/2016 | Morichi | G05B 19/40937 |

FOREIGN PATENT DOCUMENTS

| | | |
|---|---|---|
| CN | 101271326 A | 9/2008 |
| CN | 101615022 A | 12/2009 |

(Continued)

*Primary Examiner* — Paul B Yanchus, III
(74) *Attorney, Agent, or Firm* — Cheng-Ju Chiang

(57) ABSTRACT

A method for cutter path planning is disclosed. The method includes: obtaining a first and a second programmed path of a workpiece, computing for a corresponding first cutter path based on the first programmed path and a radius of the cutter, and computing for a corresponding second cutter path based on the second programmed path and the radius of the cutter; and computing for a transition path connecting an end point of the first cutter path and a start point of the second cutter path based on the first and second cutter paths, wherein the distance from any one point on the transition path to either the first or second programmed path would be greater than or equal to the radius of the cutter. An apparatus for cutter path planning, a method and an apparatus for workpiece machining are also disclosed.

20 Claims, 9 Drawing Sheets

(56) References Cited

FOREIGN PATENT DOCUMENTS

| | | | |
|---|---|---|---|
| CN | 103076761 | A | 5/2013 |
| CN | 103268081 | A | 8/2013 |
| CN | 103616849 | A | 3/2014 |
| GB | 1215065 | A | 12/1970 |

\* cited by examiner

METHODS AND APPARATUSES FOR CUTTER PATH PLANNING AND FOR WORKPIECE MACHINING

CROSS REFERENCE TO RELATED APPLICATIONS

The present application is a 35 U.S.C. § 371 National Phase conversion of International (PCT) Patent Application No. PCT/CN2014/093169, filed on Dec. 5, 2014, which claims benefit of Chinese Application No. 201310661549.0, filed on Dec. 6, 2013, the disclosure of which is incorporated by reference herein. The PCT International Patent Application was filed and published in Chinese.

FIELD OF THE DISCLOSURE

The present disclosure relates to computer numerical control (CNC) machining, and more particularly, to methods and apparatuses for cutter path planning and for workpiece machining.

BACKGROUND OF THE DISCLOSURE

CNC machine tools typically control cutter paths during the machining process. For sake of convenience, users may usually work out a machining program according to the contours of a workpiece to derive a programmed path, and the desired cutter path can be obtained by offsetting the programmed path by one radius of the cutter. The function of a numerical device being capable of automatically generating the cutter path in real time is often referred to as the cutter path planning function. Regarding two respective curves (i.e., the programmed path) belonging to different planes when performing the cutter path planning in a three-dimensional space, due to the inconsistency between the spatial normal vectors of the curves at their transition point (the intersection of the two curves), the resultant cutter paths corresponding to the two curves may not be on the same plane, that is, the cutter paths may not have an intersection.

Referring to FIG. 1, in which mk and kn are two programmed paths in a three-dimensional space, $m_1k_1$ is a corresponding cutter path of mk, whilst $k_2n_1$ is a corresponding cutter path of kn, and $m_1k_1$ and $k_2n_1$ are skew lines as they lie in separate planes. Further, G1 is the cutter radius compensation plane of mk and G2 is the cutter radius compensation plane of kn, G1 and G2 intersecting in line OU. And mk and OU form an angle $\alpha > 90°$, kn and OU form an angle $\beta > 90°$, and $\alpha \leq \beta$. A prior art method for cutter path planning at the transition part of two programmed paths may comprise: finding a point $k_1'$ on line $m_1k_1$, ensuring $kk_1'=r$, wherein r is the radius of the cutter, point $k_1'$ is a transition point, and the machining path order for the cutter is $m_1k_1' \to k_1'k_2 \to k_2n_1$.

Applicant of the present disclosure, however, has found in long-term research and development that in the prior art cutter path planning method the distance from the transition point $k_1'$ to the programmed path kn is smaller than the radius r of the cutter, such that when machining a workpiece, the part that shouldn't be processed may be cut off, thus leading to over-cutting issues.

SUMMARY OF THE DISCLOSURE

A principal problem to be addressed by the disclosure is to provide methods and apparatuses for cutter path planning and for workpiece machining, to better solve the over-cutting issues during the machining process to enable a smooth transition between two cutter paths.

According to one aspect of the disclosure, a method for cutter path planning is disclosed. The method may comprise: obtaining a programmed path for a workpiece, wherein the programmed path may be comprised of a first and a second programmed path; computing for a corresponding first cutter path based on the first programmed path and a radius of a cutter and for a corresponding second cutter path based on the second programmed path and the radius of the cutter, wherein an intersection of the first and second programmed paths corresponds to an end point of the first cutter path and to a start point of the second cutter path; and computing for a transition path connecting the end point of the first cutter path and the start point of the second cutter path based on the first and second cutter paths, wherein the distance from any one point on the transition path to either the first or the second programmed path is not smaller than the radius of the cutter.

The transition path may be a curve.

The transition path may be comprised of straight line segments.

The transition path may be comprised of a first transition path, a second and a third transition path connecting end to end. When the last segment of the first cutter path is a curve, the first transition path may be a tangent to the first cutter path at its end point; when the last segment of the first cutter path is a straight line, the first transition path may be an extension line of the first cutter path passing through the end point. When the first segment of the second cutter path is a curve, the second transition path may be a tangent to the second cutter path at its start point; when the first segment of the second cutter path is a straight line, the second transition path may be an extension line of the second cutter path passing through the start point. A first transition point may be selected on the first transition path and a second transition point may be selected on the second transition path, therefore the third transition path may be a line segment connecting the first and second transition points.

If the connection between the first and second programmed paths is of an elongated or shortened type and meanwhile the first and second programmed paths are skew lines, then the transition path may be perpendicular both to a radius compensation direction vector $\vec{r}_1$ of a first tangent to the first cutter path at its endpoint and to a radius compensation direction vector $\vec{r}_2$ of a second tangent to the second cutter path at its start point; if the connection of the first and second programmed paths is of an inserted type, then a length of the first transition path may be equal to that of the second transition path, and the distance from the intersection of the first and second programmed paths to the third transition path may be equal to the cutter radius r.

If the connection between the first and second programmed paths is of the elongated or shortened type, then the first and second transition points D and E on the transition path can be derived as follows:

$$\begin{cases} D = B' + s * \vec{l}_1 \\ E = B'' + t * \vec{l}_2 \\ s = \dfrac{\overline{B'B''} * \vec{r}_2}{\vec{l}_1 * \vec{r}_2} (\vec{l}_1 * \vec{r}_2 \neq 0) \\ t = \dfrac{-\overline{B'B''} * \vec{r}_1}{\vec{l}_2 * \vec{r}_1} (\vec{l}_2 * \vec{r}_1 \neq 0) \end{cases}$$

Wherein, $\vec{l}_1$ is a unit direction vector of the first tangent and $\vec{l}_2$ is a unit direction vector of the second tangent. When $\vec{l}_1 * \vec{r}_2 = 0$, the first transition point D may be an intersection of a common perpendicular of the first and second tangents with the first tangent; when $\vec{l}_2 * \vec{r}_1 = 0$, the second transition point E may be an intersection of the common perpendicular of the first and second tangents with the second tangent.

If the connection between the first and second programmed paths is of an inserted type, then the first and second transition points D and E on the transition path can be derived as follows:

$$\begin{cases} D = B' + x * \vec{l}_1 \\ E = B'' + x * \vec{l}_2 \end{cases}$$

Wherein, $\vec{l}_1$ is a unit direction vector of the first tangent, $\vec{l}_2$ is a unit direction vector of the second tangent, and x is a positive solution of the equation $$\left( \frac{B' + B'' + x(\vec{l}_1 + \vec{l}_2)}{2} - B \right)^2 = r^2.$$

According to a second aspect of the disclosure, a method for workpiece machining is disclosed. The method may comprise: obtaining a programmed path for a workpiece, wherein the programmed path may be comprised of a first and a second programmed path; computing for a corresponding first cutter path based on the first programmed path and a radius of a cutter and for a corresponding second cutter path based on the second programmed path and the radius of the cutter, wherein an intersection of the first and second programmed paths corresponds to an end point of the first cutter path and to a start point of the second cutter path; computing for a transition path connecting the end point of the first cutter path and the start point of the second cutter path based on the first and second cutter paths, wherein the distance from any one point on the transition path to either the first or the second programmed path is not smaller than the radius of the cutter; and machining the workpiece according to a machining toolpath sequence of the first cutter path, the transition path, and the second cutter path.

According to a third aspect of the disclosure, an apparatus for cutter path planning is disclosed. The apparatus may comprise: a programmed path acquisition module configured to obtain a programmed path for a workpiece, wherein the programmed path may be comprised of a first and a second programmed path; a cutter path computation module configured to compute for a corresponding first cutter path based on the first programmed path and a radius of a cutter and for a corresponding second cutter path based on the second programmed path and the radius of the cutter, wherein an intersection of the first and second programmed paths corresponds to an end point of the first cutter path and to a start point of the second cutter path; and a transition path computation module configured to compute for a transition path connecting the end point of the first cutter path and the start point of the second cutter path based on the first and second cutter paths, wherein the distance from any one point on the transition path to either the first or the second programmed path is not smaller than the radius of the cutter.

According to a fourth aspect of the disclosure, an apparatus for workpiece machining is disclosed. The apparatus may comprise: a programmed path acquisition module configured to obtain a programmed path for a workpiece, wherein the programmed path may be comprised of a first and a second programmed path; a cutter path computation module configured to compute for a corresponding first cutter path based on the first programmed path and a radius of a cutter and for a corresponding second cutter path based on the second programmed path and the radius of the cutter, wherein an intersection of the first and second programmed paths corresponds to an end point of the first cutter path and to a start point of the second cutter path; a transition path computation module configured to compute for a transition path connecting the end point of the first cutter path and the start point of the second cutter path based on the first and second cutter paths, wherein the distance from any one point on the transition path to either the first or the second programmed path is not smaller than the radius of the cutter; and a milling module configured to machine the workpiece according to a machining toolpath sequence of the first cutter path, the transition path, and the second cutter path.

Advantages of the disclosure may follow: differing from the prior art, the present disclosure first obtains the programmed path of a workpiece, calculates further a corresponding first cutter path based on a first programmed path and a radius of the cutter and a corresponding second cutter path based on a second programmed path and the radius of the cutter, and finally calculates, based on the first and second cutter paths, a transition path connecting the end point of the first cutter path and the start point of the second cutter path, meanwhile ensuring the distance from any one point on the transition path to either of the first and second programmed paths is not smaller than the radius of the cutter, so that when the cutter is milling at the transition part, it will not go beyond the programmed path, that is, it will not cut away the part which should not be cut. Therefore the disclosure can well solve the over-cutting issues to enable a smooth transition between the two cutter paths.

DETAILED DESCRIPTION OF THE DISCLOSURE

Hereinafter the technical solutions of the disclosure will be described in definite and comprehensive details in connection with the embodiments and accompanying drawings of the disclosure. Obviously, the embodiments as described are only some but not all of the embodiments of the disclosure. All other embodiments derived by those of ordinary skill in the art based on the embodiments disclosed without making inventive efforts shall all fall in the protection of the disclosure.

In the machining process of computer numerical control (CNC) machining tools, typically a cutter is controlled to mill the workpiece according to a cutter path, whilst users may generally write out a machining program based on the contours of the workpiece to derive a programmed path for the workpiece. The cutter, however, may have a radius of a certain value, such that the cutter path may not coincide with the programmed path. To be specific, the cutter path may typically offset from the programmed path by one radius of the cutter. The process of obtaining the cutter path and the transition path between segments of the cutter path is called the cutter path planning process.

Figure 1:
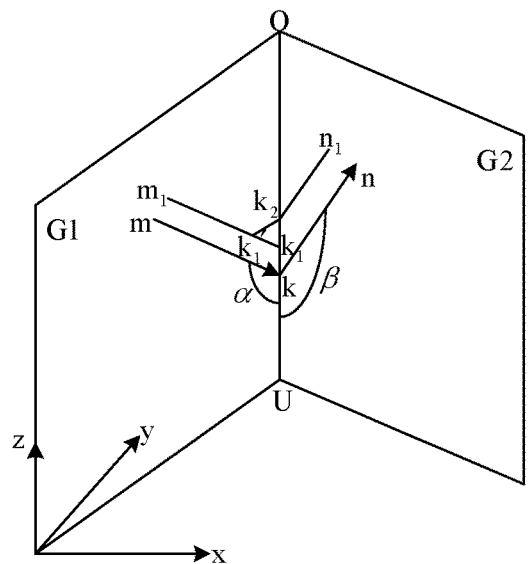
FIG. 1 is a schematic diagram illustrating a prior art cutter path planning solution.
Figure 2:
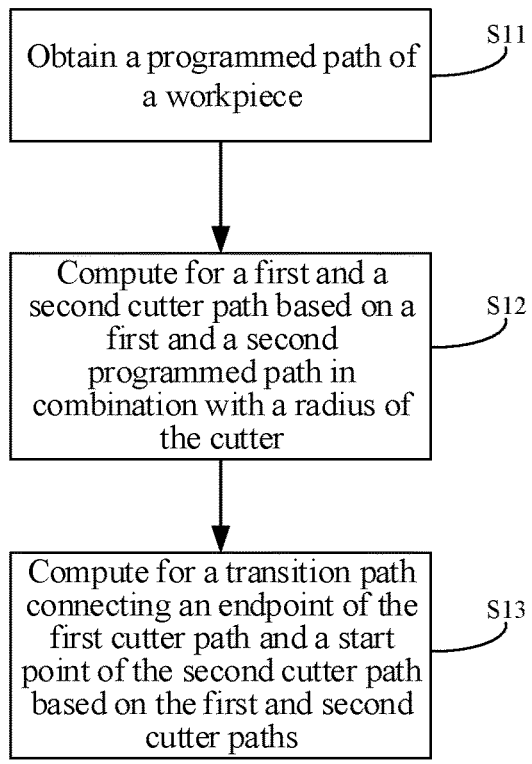
FIG. 2 is a flowchart illustrating a first embodiment of a cutter path planning method according to the disclosure.

Referring now to FIG. 2, the first embodiment of the cutter path planning method according to the disclosure may comprise the following steps.

In a first step S11, a programmed path for a workpiece is obtained.

The programmed path may be comprised of a first and a second programmed path connecting end to end. Typically, the programmed path is a machining path prepared in a numerical control (NC) system according to the size and contours of a workpiece. The first programmed path can be a straight or curved path. Likewise, the second programmed path can also be a straight or curved path. When a programmed path is a straight one, the corresponding cutter path would also be a straight path; otherwise when a programmed path is a curved one, the corresponding cutter path would also be a curved one. The method can proceed further to step S12.

In the following step S12, a first and a second cutter path are calculated based on the first and second programmed paths and the radius of the cutter.

The corresponding first cutter path can be calculated based on the first programmed path and the radius of the cutter, whilst the corresponding second cutter path can be calculated based on the second programmed path and the radius of the cutter. An intersection of the first and second programmed paths corresponds to an end point of the first cutter path and to a start point of the second cutter path. The cutter paths acquisition process can specifically comprise offsetting the center of the cutter, along a direction perpendicular to a tangent of the first or the second programmed path, by one cutter radius to get the first or second cutter path. Herein, an end point of the first programmed path is connected to a start point of the second programmed path. The method can then proceed to step S13.

In the following step S13, the first and second cutter paths are based on to compute for a transition path connecting the end point of the first cutter path and the start point of the second cutter path.

The transition path is computed as such that the distance from any one point on the transition path to either the first programmed path or the second programmed path is greater or equal to the radius of the cutter. The transition path may be a straight line or a curve. Thus, by the above method the first and second cutter paths, as well as the transition path connecting the first and second cutter paths can be obtained.

It can be appreciated that according to the first embodiment of the cutter path planning method, the programmed path for a workpiece can be first obtained, further a first and a second programmed path can be computed based on the first and second programmed paths and the radius of the cutter, and finally a transition path connecting the end point of the first cutter path and the start point of the second cutter path can be calculated based on the first and second cutter paths, meanwhile it is ensured that the distance from any one point on the transition path to either of the first and second programmed paths is not smaller than the radius of the cutter, so that when the cutter is milling at the transition part, it will not go beyond the programmed path, that is, it will not cut away the part which should not be cut. Therefore the present embodiment can well solve the over-cutting issues to enable a smooth transition between the two cutter paths.

Referring now to FIGS. 3-12, the second embodiment of the cutter path planning method will be described below in which the connection of the programmed paths comprises an elongated type and a shortened type.

The elongated type is defined as that an angle between the first and second programmed paths at the intersection at the non-machining side satisfies 90°≤T<180°, as shown in FIGS. 4 through 8. The shortened type is defined as that an angle between the first and second programmed paths at the intersection at the non-machining side satisfies T≥180°, as shown in FIGS. 9 through 12.

Figure 3:
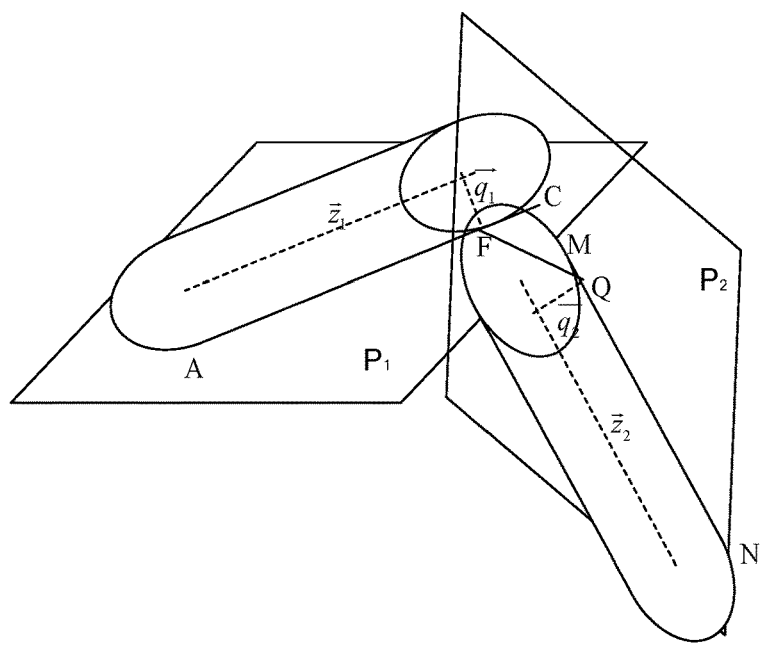
FIG. 3 is a schematic diagram illustrating the notion of generalized intersections according to a second embodiment of the cutter path planning method of the disclosure.

Of the elongated or shortened type in the present embodiment, a first and a second transition point on a first and a second tangent can be the generalized intersections between the first and second tangents. Referring now to FIG. 3, a definition of the generalized intersections is given as follows: AC and MN are two straight lines respectively lying in planes P1 and P2, and they are skew lines located in separate planes, meaning they don't share a common plane. The generalized intersections of the lines AC and MN can be derived by selecting a point F on line AC and another point Q on line MN, meanwhile ensuring that $FQ \perp \vec{q}_1$ and $FQ \perp \vec{q}_2$, wherein $\vec{q}_1$ and $\vec{q}_2$ are respectively a direction vector which lies on the plane P1 and is perpendicular to the line AC and a direction vector which lies on the plane P2 and is perpendicular to the line MN. That is, the points F and Q are the generalized intersections of the lines AC and MN. The generalized intersections can have the following characteristics: for a cylinder taking as its axis any one straight line $\vec{z}_1$ that lies in the plane P1 and is parallel to line AC, the line segment FQ would be tangent to the cylinder at point F; when assume the distance from point F to the axis $\vec{z}_1$ of the cylinder is $|\vec{q}_1|$, then the distance from any one point, other than point F, on the segment FQ to an arbitrary point on the axis $\vec{z}_1$ of the cylinder would be greater than $|\vec{q}_1|$. Likewise, for a cylinder taking as its axis any one straight line $\vec{z}_2$ that lies in the plane P2 and is parallel to line MN, the line segment FQ would be tangent to the cylinder at point Q; when assume the distance from point Q to the axis $\vec{z}_2$ of the cylinder is $|\vec{q}_2|$, then the distance from any one point, other than point Q, on the segment FQ to an arbitrary point on the axis $\vec{z}_2$ of the cylinder would be greater than $|\vec{q}_2|$.

Figure 4:
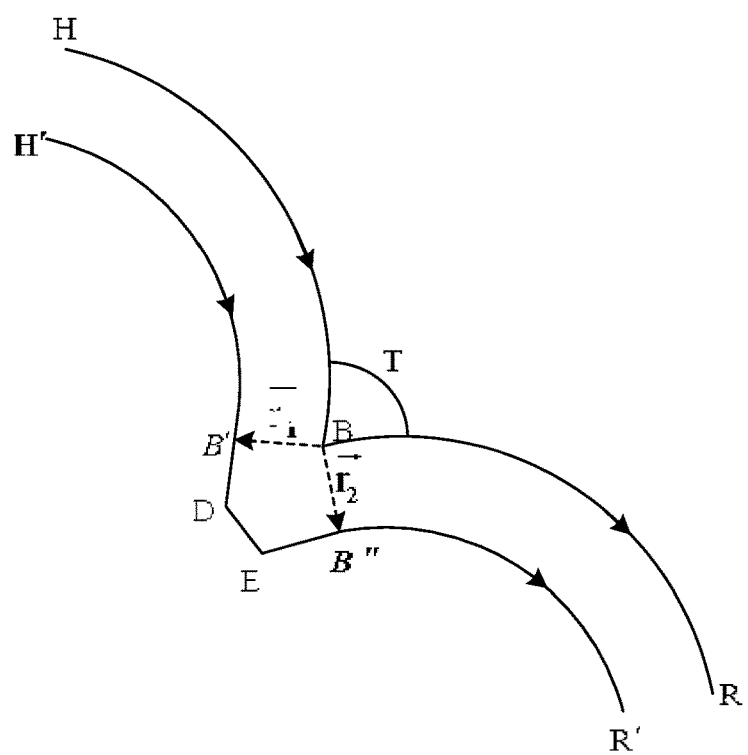
FIG. 4 is a geometric diagram illustrating the second embodiment of the cutter path planning method, in which the connection is of an elongated type and combines two curved paths.

Referring now to FIG. 4, in which the connection between the first and second programmed paths is of the elongated type, and the first and second programmed paths are two curved programmed paths in a three-dimensional space. The corresponding cutter path planning process can be as follows:

1) Obtain the first programmed path HB and the second programmed path BR.

2) Offset rightward by one radius of the cutter along the forward direction of the first programmed path HB and the second programmed path BR respectively to obtain a first cutter path H'B' and a second cutter path B"R' (in this case the cutter paths are on the right side of the programmed paths, indicating the cutter radius compensation is on the right, i.e., the cutter stays to the right of the programmed path).

3) Obtain a first tangent to the first cutter path H'B' at the end point B' of the first cutter path and a second tangent to the second cutter path B"R' at the start point B" of the second cutter path. The first and second tangents are straights lines in separate planes, i.e., they are skew lines.

Then a desired first transition point D on the transition path can be obtained from the first tangent, whilst a desired second transition point E on the transition path can be obtained from the second tangent. The first and second tangents D and E can be derived according to the following equations:

$$\begin{cases} D = B' + s * \vec{l}_1 \\ E = B'' + t * \vec{l}_2 \\ s = \dfrac{\overrightarrow{B'B''} * \vec{r}_2}{\vec{l}_1 * \vec{r}_2} (\vec{l}_1 * \vec{r}_2 \neq 0) \\ t = \dfrac{-\overrightarrow{B'B''} * \vec{r}_1}{\vec{l}_2 * \vec{r}_1} (\vec{l}_2 * \vec{r}_1 \neq 0) \end{cases}$$

Wherein, $\vec{r}_1$ is a radius compensation direction vector of the first tangent, $\vec{r}_2$ is a radius compensation direction vector of the second tangent. The radius compensation direction vector $\vec{r}_1$ of the first tangent is a line connecting the end point of the first cutter path and the intersection of the first and second programmed paths, whilst the radius compensation direction vector $\vec{r}_2$ of the second tangent is a line connecting the start point of the second cutter path and the intersection of the first and second programmed paths. And $\vec{r}_1$ and $\vec{r}_2$ are perpendicular respectively to the first and second tangents, and $|\vec{r}_1|=|\vec{r}_2|=r$. B' is the end point of the first cutter path, B" is the start point of the second cutter path, $\vec{l}_1$ is a unit direction vector of the first tangent, and $\vec{l}_2$ is a unit direction vector of the second tangent. When $\vec{l}_1 * \vec{r}_2 = 0$, the first transition point D may be an intersection of a common perpendicular of the first and second tangents with the first tangent; when $\vec{l}_2 * \vec{r}_1 = 0$, the second transition point E may be an intersection of the common perpendicular of the first and second tangents with the second tangent.

In the current embodiment, the first and second tangents correspond respectively to the straight lines AC and MN in the aforementioned definition of generalized intersections, and the first and second transition points D and E correspond to the above generalized intersections F and Q, respectively.

Draw a line between the first transition point D and the second transition point E to obtain the intermediate transition path DE. Likewise, draw lines connecting B' to D, and E to B", to derive the desired transition path connecting the end point of the first cutter path and the start point of the second cutter path. The resultant transition path may be consisted of parts B'D, EB", and the intermediate transition path DE, so far the cutter path planning is completed. Note that curved lines or straights lines can be employed to connect the first and second transition points to obtain the intermediate transition path DE. The intermediate transition path DE then corresponds to the aforementioned line segment FQ. The radius compensation direction vector $\vec{r}_1$ of the first tangent and the radius compensation direction vector $\vec{r}_2$ of the second tangent then correspond respectively to the aforementioned $\vec{q}_1$ and $\vec{q}_2$. Herein, the first and second programmed paths are skew lines lying in separate planes, the intermediate transition path DE is perpendicular both to the radius compensation direction vector $\vec{r}_1$ of the first tangent and to the radius compensation direction vector $\vec{r}_2$ of the second tangent. The specific solving process of the above s and t can follow.

According to $DE \perp \vec{r_1}$ and $DE \perp \vec{r_2}$ we obtain $\vec{DE} * \vec{r_1} = (\vec{B'B''} + t*\vec{l_2} - s*\vec{l_1}) * \vec{r_1} = 0$, $\vec{DE} * \vec{r_2} = (\vec{B'B''} + t*\vec{l_2} - s*\vec{l_1}) * \vec{r_2} = 0$ thus further solving the equations we get $$s = \frac{\vec{B'B''} * \vec{r_2}}{\vec{l_1} * \vec{r_2}}, t = \frac{-\vec{B'B''} * \vec{r_1}}{\vec{l_2} * \vec{r_1}}.$$

Since the first transition point D and the second transition point E correspond to the aforementioned generalized intersections, from the characteristics of generalized intersections it can be known that the distance from any point on the intermediate transition path DE to either the first programmed path HB or the second programmed path BR would be greater than or equal to the radius r of the cutter; furthermore, the distance from line segment B'D or EB'' to either of the first and second programmed paths would be greater than or equal to the radius of the cutter. Namely, the distance from any one point on the transition path to either of the first and second programmed paths would be not smaller than the radius r of the cutter.

Figure 5:
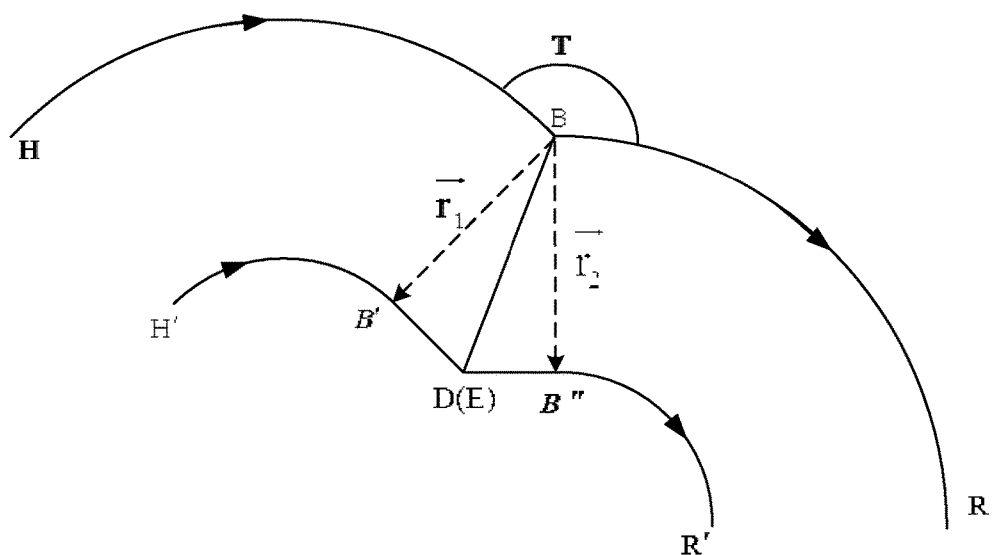
FIG. 5 is a geometric diagram illustrating the second embodiment of the cutter path planning method, in which the connection is of an elongated type and combines two curved paths located within a two-dimensional plane.
Figure 6:
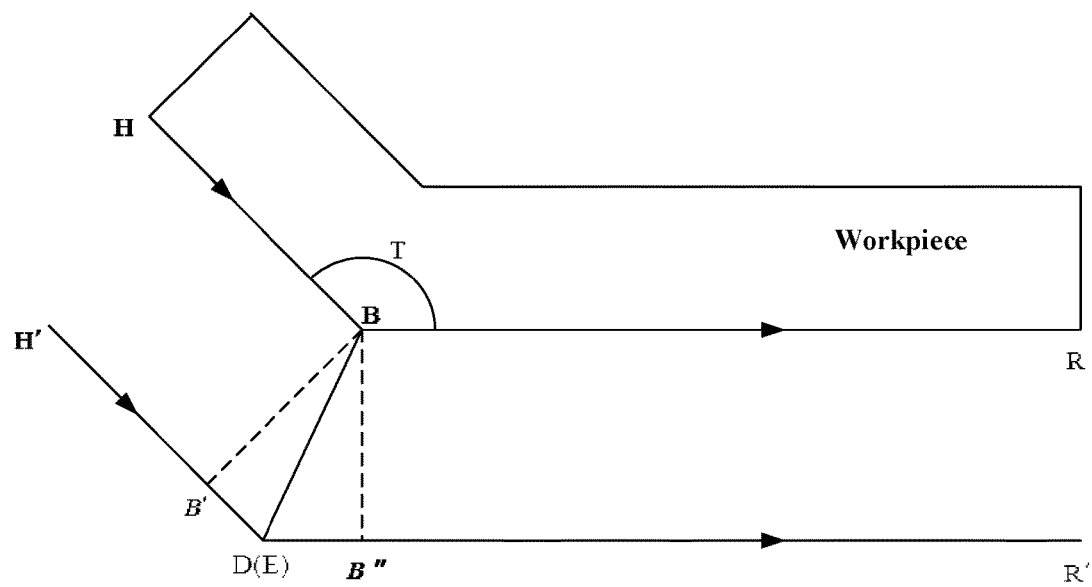
FIG. 6 is a geometric diagram illustrating the second embodiment of the cutter path planning method, in which the connection is of an elongated type and combines two straight paths located within a two-dimensional plane.
Figure 7:
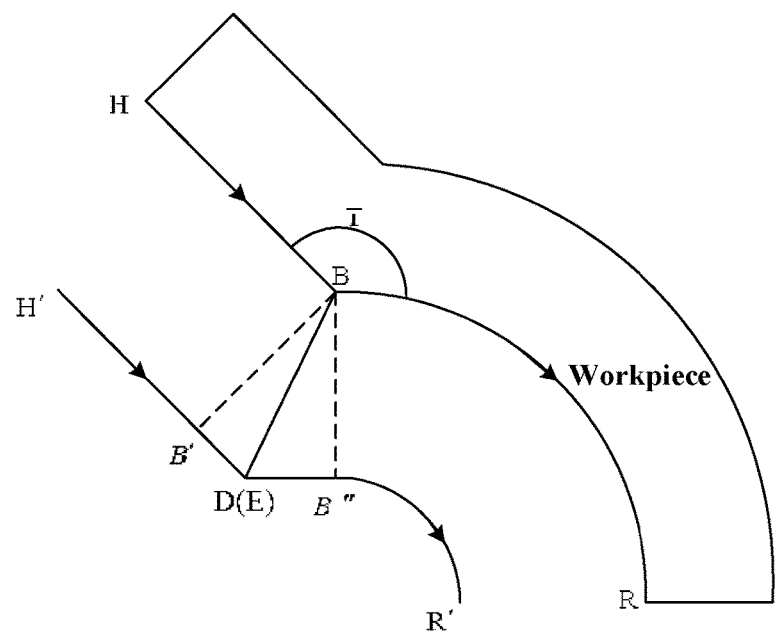
FIG. 7 is a geometric diagram illustrating the second embodiment of the cutter path planning method, in which the connection is of an elongated type and combines a straight path to a curved path in a two-dimensional plane.
Figure 8:
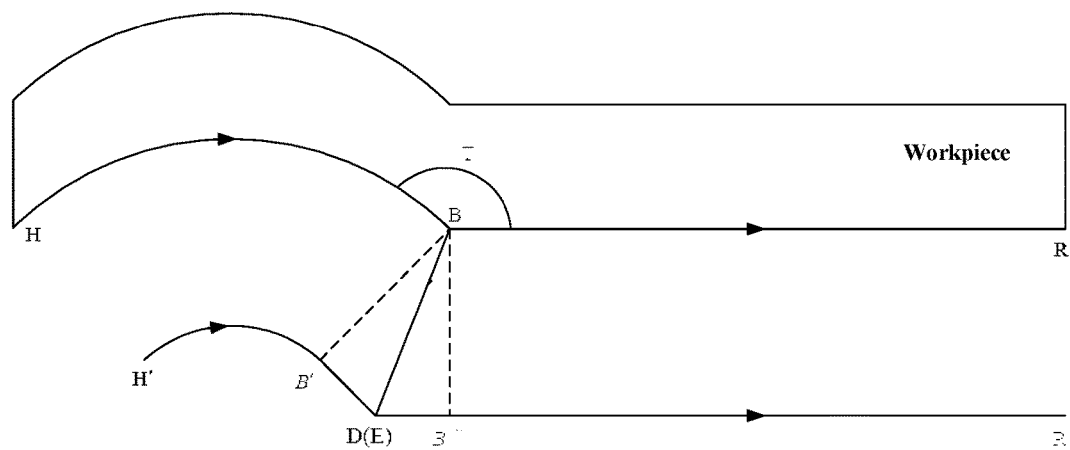
FIG. 8 is a geometric diagram illustrating the second embodiment of the cutter path planning method, in which the connection is of an elongated type and combines a curved path to a straight path in a two-dimensional plane.

Referring now to FIG. 5, in which the connection between the first and second programmed paths is of the elongated type, and the first and second programmed paths are two curved programmed paths in a two-dimensional plane. The corresponding cutter path planning process can be as follows:

1) Obtain the first programmed path HB and the second programmed path BR.

2) Offset rightward by one radius of the cutter along the forward direction of the first programmed path HB and the second programmed path BR respectively to obtain the first cutter path H'B' and the second cutter path B''R' (in this case the cutter paths are on the right side of the programmed path, which indicates the cutter radius compensation is on the right, i.e., the cutter stays to the right of the programmed path).

3) Obtain a first tangent to the first cutter path H'B' at the end point B' of the first cutter path and a second tangent to the second cutter path B''R' at the start point B'' of the second cutter path.

4) Obtain a first transition point D on the first tangent and a second transition point E on the second tangent. The first and second transition points D and E can be derived as follows:

$$\begin{cases} D = B' + s * \vec{l_1} \\ E = B'' + t * \vec{l_2} \\ s = \frac{\vec{B'B''} * \vec{r_2}}{\vec{l_1} * \vec{r_2}} (\vec{l_1} * \vec{r_2} \neq 0) \\ t = \frac{-\vec{B'B''} * \vec{r_1}}{\vec{l_2} * \vec{r_1}} (\vec{l_2} * \vec{r_1} \neq 0) \end{cases}$$

The first transition point D and the second transition point E may correspond to the aforementioned generalized intersections F and Q, respectively. In terms of the two-dimensional plane, the first and second tangents would be coplanar straight lines, thus from $\vec{DE} * \vec{r_1} = 0$ and $\vec{DE} * \vec{r_2} = 0$ we obtain $\vec{DE} = 0$, namely, the first transition point D and the second transition point E coincide with each other, both being the intersection of the first and second tangents, that is, the aforementioned generalized intersections in a two-dimensional plane is in fact the solid intersection of the two coplanar tangents.

Then to connect the first transition point D to the second transition point E to obtain the intermediate transition path DE, either the point D or E can be chosen since they coincide, namely, the intermediate transition path DE is the either point D or E. By further drawing lines connecting B' to D, and E to B'', the desired transition path can be finally derived and the cutter path planning can thus be completed. At this time, since the distance from any one point, i.e., the first transition point D or the second transition point E, on the intermediate transition path DE to either the first programmed path HB or the second programmed path BR is greater than the radius of the cutter r, it implies that the distance from any one point on the transition path to either the first or second programmed path would be no smaller than the radius r of the cutter.

Figure 9:
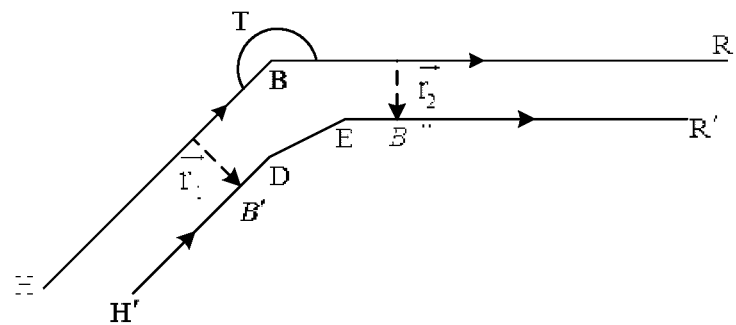
FIG. 9 is a geometric diagram illustrating the second embodiment of the cutter path planning method, in which the connection is of a shortened type and combines two straight paths in a three-dimensional space.

Referring now to FIG. 9, in which the connection between the first and second programmed paths is of the shortened type, and the first and second programmed paths are two straight programmed paths in a three-dimensional space. The corresponding cutter path planning process can be as follows:

1) Obtain the first programmed path HB and the second programmed path BR.

2) Offset rightward by one radius of the cutter along the forward direction of the first programmed path HB and the second programmed path BR respectively to obtain the first cutter path H'B' and the second cutter path B''R'.

3) Obtain a first tangent to the first cutter path H'B' at the end point B' of the first cutter path and a second tangent to the second cutter path B''R' at the start point B'' of the second cutter path. Because the first and second cutter paths are straight paths, the corresponding first and second tangents would be the respective lines where the first and second cutter paths are in. The first and second cutter paths may be skew lines lying in separate planes, accordingly, the first and second tangents may also be skew lines.

Then a first transition point D can be obtained on the first tangent and a second transition point E can be obtained on the second tangent. The first and second transition points D and E can be derived as follows:

$$\begin{cases} D = B' + s * \vec{l_1} \\ E = B'' + t * \vec{l_2} \\ s = \frac{\vec{B'B''} * \vec{r_2}}{\vec{l_1} * \vec{r_2}} (\vec{l_1} * \vec{r_2} \neq 0) \\ t = \frac{-\vec{B'B''} * \vec{r_1}}{\vec{l_2} * \vec{r_1}} (\vec{l_2} * \vec{r_1} \neq 0) \end{cases}$$

The first and second tangents may correspond respectively to the straight lines AC and MN in the aforementioned definition of generalized intersections, and the first and second transition points D and E may correspond to the above generalized intersections F and Q, respectively.

Then one can connect the first transition point D to the second transition point E to obtain the intermediate transition path DE, and further draw lines connecting B' to D, and E to B'', the desired cutter path planning can thus be completed. The intermediate transition path DE then may correspond to the aforementioned line segment FQ in the aforementioned definition of generalized intersections. The radius compensation direction vector $\vec{r}_1$ of the first tangent and the radius compensation direction vector $\vec{r}_2$ of the second tangent then may correspond respectively to the aforementioned $\vec{q}_1$ and $\vec{q}_2$. Herein, the first and second programmed paths are skew lines lying in separate planes, and the intermediate transition path DE is perpendicular both to the radius compensation direction vector $\vec{r}_1$ of the first tangent and to the radius compensation direction vector $\vec{r}_2$ of the second tangent. Since the first transition point D and the second transition point E correspond to the aforementioned generalized intersections, from the characteristics of generalized intersections it can be known that the distance from any point on the intermediate transition path DE to either the first programmed path HB or the second programmed path BR would be greater than or equal to the radius r of the cutter. Thus, the distance from any one point on the transition path to either of the first and second programmed paths would be not smaller than the radius r of the cutter.

Figure 10:
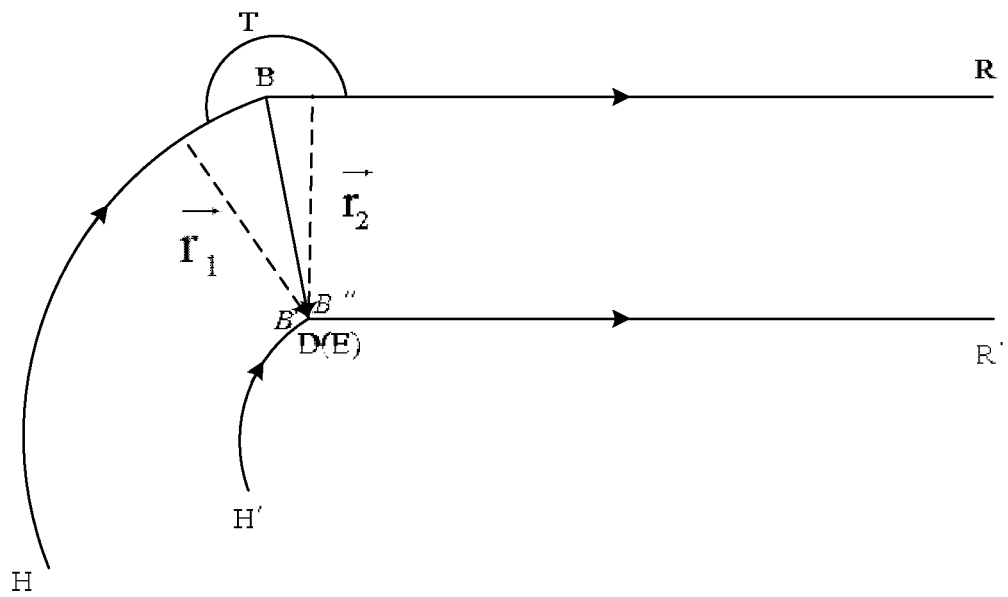
FIG. 10 is a geometric diagram illustrating the second embodiment of the cutter path planning method, in which the connection is of a shortened type and combines a curved path to a straight path in a two-dimensional plane.
Figure 11:
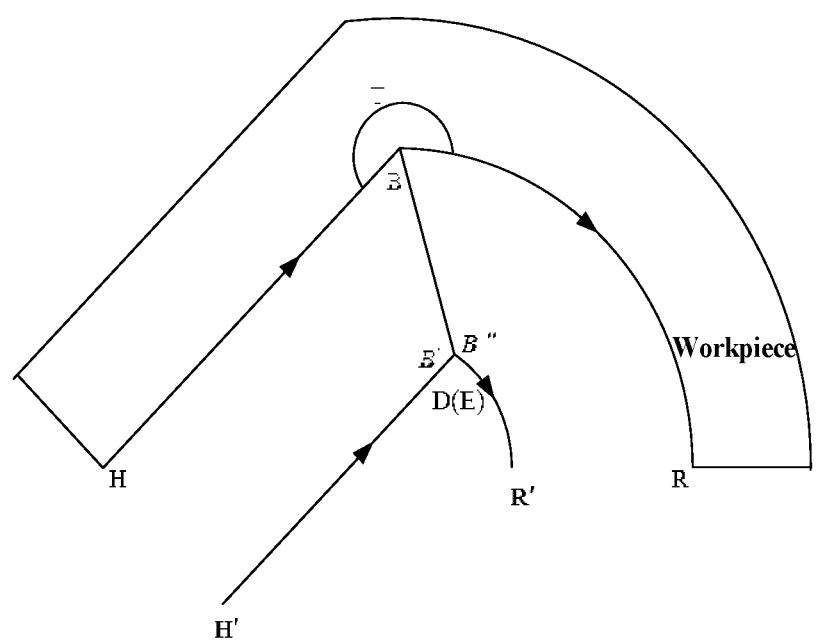
FIG. 11 is a geometric diagram illustrating the second embodiment of the cutter path planning method, in which the connection is of a shortened type and combines a straight path to a curved path in a two-dimensional plane.
Figure 12:
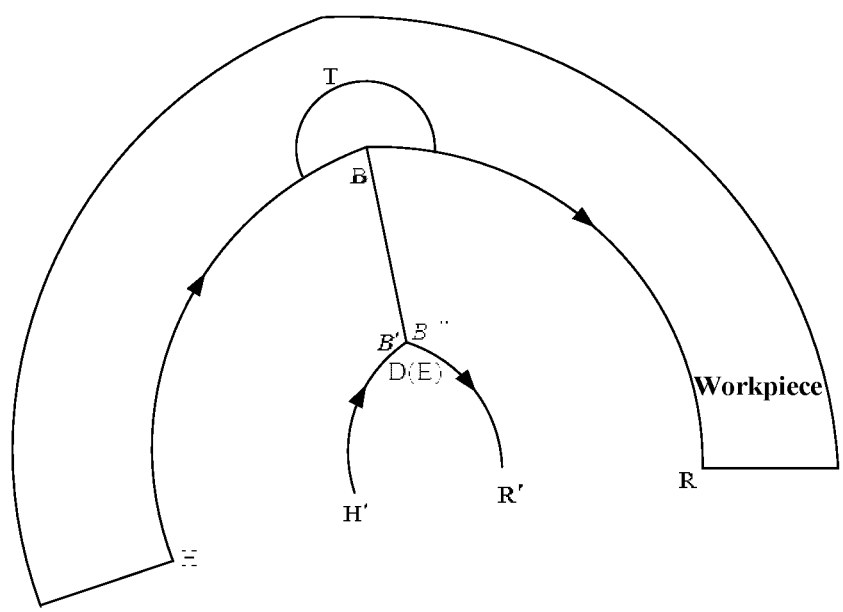
FIG. 12 is a geometric diagram illustrating the second embodiment of the cutter path planning method, in which the connection is of a shortened type and combines two curved paths in a two-dimensional plane.

Referring now to FIG. 10, in which the connection between the first and second programmed paths is of the shortened type, and the first programmed path is a curved path whilst the second programmed path is a straight path, both paths belonging to a same two-dimensional plane. The corresponding cutter path planning process can be as follows:

1) Obtain the first programmed path HB and the second programmed path BR.

2) Offset rightward by one radius of the cutter along the forward direction of the first programmed path HB and the second programmed path BR respectively to obtain the first cutter path H'B' and the second cutter path B"R'.

3) Obtain a first tangent to the first cutter path H'B' at the end point B' of the first cutter path and a second tangent to the second cutter path B"R' at the start point B" of the second cutter path. Because the second cutter path B"R' is a straight path, the second tangent at its start point would be the straight line where the second cutter path B"R' is in.

Then a first transition point D can be obtained on the first tangent and a second transition point E can be obtained on the second tangent. The first and second transition points D and E can be derived as follows:

$$\begin{cases} D = B' + s * \vec{l}_1 \\ E = B'' + t * \vec{l}_2 \\ s = \dfrac{\overrightarrow{B'B''} * \vec{r}_2}{\vec{l}_1 * \vec{r}_2}(\vec{l}_1 * \vec{r}_2 \neq 0) \\ t = \dfrac{-\overrightarrow{B'B''} * \vec{r}_1}{\vec{l}_2 * \vec{r}_1}(\vec{l}_2 * \vec{r}_1 \neq 0) \end{cases}$$

The first transition point D and the second transition point E may then correspond to the aforementioned generalized intersections F and Q, respectively. Thus in terms of the two-dimensional plane, the first and second tangents would be coplanar straight lines, from $\overrightarrow{DE}*\vec{r}_1=0$ and $\overrightarrow{DE}*\vec{r}_2=0$ we obtain $\overrightarrow{DE}=0$. Thus, the first transition point D coincides with the second transition point E, both being the intersection of the first and second tangents; furthermore, all four points D, E, B', and B" coincide with one another.

Then to connect the first transition point D to the second transition point E to obtain the intermediate transition path DE, either the point D or E can be chosen since the they coincide, namely, the intermediate transition path DE is the point D or E, in which case the transition path would be any one of the points D, E, B', and B", thus the cutter path planning can be so completed. It is worth mentioning that at this time the distance from an arbitrary point on the transition path to either of the first and second programmed paths is still greater than or equal to the radius r of the cutter.

In the current embodiment the first programmed path can be a straight or curved path, similarly the second programmed path can also be a straight or curved one.

It can be appreciated that, according to the second embodiment of the cutter path planning method in which the connection between segmented programmed paths is of an elongated or shortened type, the notion of generalized intersections of two straights lines is first defined. (The generalized intersections comprise substantially the first transition point on the first tangent and the second transition point on the second tangent) Then lines are drawn to connect sequentially end to end the end point of the first cutter path, the first transition point, the second transition point, and the start point of the second cutter path to derived the resultant transition path, and the distance from any point on the transition path to either of the first and second programmed paths would be greater than or equal to the radius of the cutter. Thus, when the cutter is milling at the transition part, it will not go beyond the programmed path, that is, it will not cut off the part of the workpiece that should not be cut, which therefore can well solve the over-cutting issues to enable a smooth transition between the two cutter paths; in addition, the cutter path planning method is compatible with the programmed paths in a two-dimensional plane as well as a three-dimensional space, resulting in easy compatibility.

Figure 13:
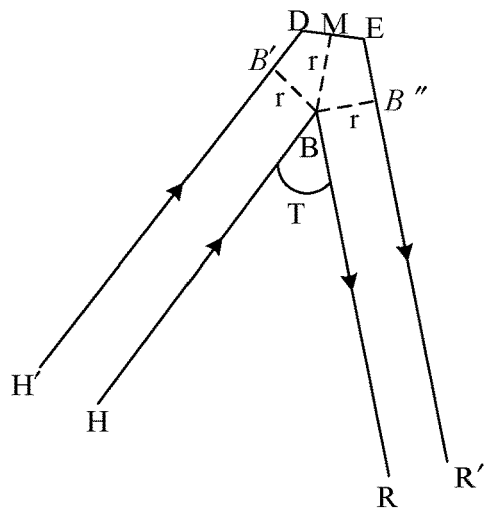
FIG. 13 is a geometric diagram illustrating a third embodiment of the cutter path planning method, in which the connection is of an inserted type and combines two straight paths in a three-dimensional space.

Referring now to FIG. 13, the third embodiment of the cutter path planning method will be described below where the connection of the programmed paths is of an inserted type. The inserted type implies that an angle between the first and second programmed paths at the intersection at the non-machining side satisfies T<90°, as shown in FIG. 13.

In FIG. 13 the connection between the first and second programmed paths is of the inserted type, and the first and second programmed paths are two straight programmed paths in a three-dimensional space. The corresponding cutter path planning process can be as follows:

1) Obtain the first programmed path HB and the second programmed path BR.

2) Offset leftward by one radius of the cutter along the forward direction of the first programmed path HB and the second programmed path BR respectively to obtain the first cutter path H'B' and the second cutter path B"R' (in this case the cutter paths are on the left side of the programmed path, indicating the cutter radius compensation is on the left, i.e., the cutter stays to the left of the programmed path).

3) Obtain a first tangent to the first cutter path H'B' at the end point B' of the first cutter path and a second tangent to the second cutter path B"R' at the start point B" of the second cutter path. Because the first and second cutter paths are straight paths, the corresponding first and second tangents would be the respective lines where the first and second cutter paths H'B' and B"R' are in. The first and second tangents may be skew lines lying in separate planes.

Then a first transition point D can be obtained on the first tangent and a second transition point E can be obtained on the second tangent. The first and second transition points D and E can be derived as follows:

$$\begin{cases} D = B' + x*\vec{l_1} \\ E = B'' + x*\vec{l_2} \end{cases}$$

Wherein, B' is the end point of the first cutter path, B" is the start point of the second cutter path, $\vec{l_1}$ is a unit direction vector of the first tangent, $\vec{l_2}$ is a unit direction vector of the second tangent, and x is a positive solution of the equation $$\left(\frac{B' + B'' + x(\vec{l_1} + \vec{l_2})}{2} - B\right)^2 = r^2.$$

Then drawing line segments between the first transition point D and the second transition point E we obtain the intermediate transition path DE; likewise, drawing lines segments to connect B' to D and E to B", we get the resultant transition path consisted of the first transition path B'D, the second transition path E B", and the third transition path (i.e., the intermediate transition path DE) connecting end to end. Specifically, when the last segment of the first cutter path is a curve, the first transition path is a tangent of the first cutter path at its end point; when the last segment of the first cutter path is a straight line, the first transition path would be an extension line of the first cutter path passing through the end point. When the first segment of the second cutter path is a curve, the second transition path may be a tangent of the second cutter path at its start point; when the first segment of the second cutter path is a straight line, the second transition path may be an extension line of the second cutter path passing through the start point. A first transition point may be selected on the first transition path and a second transition point may be selected on the second transition path, and the third transition path can thus be a line segment connecting the first and second transition points.

The length of the first transition path may be equal to that of the second transition path. The distance from the intersection of the first and second programmed paths to the third transition path would be equal to the radius of the cutter, that is, the distance from the intersection B of the first programmed path HB and the second programmed path BR to the intermediate transition path DE is the radius r of the cutter. The specific deriving process of the above points D and E can follow: let the midpoint of the intermediate transition path DE be M, from DB'=EB" we know BD=BE and BM⊥DE. Therefore, $$BM = \frac{D+E}{2} - B = \frac{B' + B'' + x(\vec{l_1} + \vec{l_2})}{2} - B$$

and BM=r, equating $$\frac{B' + B'' + x(\vec{l_1} + \vec{l_2})}{2} - B \text{ to } r$$

and solving the equation $$\left(\frac{B' + B'' + x(\vec{l_1} + \vec{l_2})}{2} - B\right)^2 = r^2$$

for a positive solution x, and substituting the x into $$\begin{cases} D = B' + x*\vec{l_1} \\ E = B'' + x*\vec{l_2} \end{cases},$$

we obtain the coordinates of points D and E.

From the relevant description of the above first transition point D and the second transition point E we know: the distance from the midpoint M of the intermediate transition path DE to either of the first and second programmed paths is equal to the radius r of the cutter, whilst the distance from any one point, other than the point M, on the intermediate transition path DE to either the first programmed path HB or the second programmed path BR would be greater than the radius r of the cutter. That is, the distance from an arbitrary point on the transition path to either of the first and second programmed paths is greater than or equal to the radius of the cutter.

Regarding the programmed paths whose connection is of the inserted type, the corresponding cutter path planning process of the two programmed paths in a two-dimensional plane resembles that in the aforementioned three-dimensional space, and thus will not be repeatedly detailed herein. In the current embodiment the first programmed path can be a straight or curved path, similarly, the second programmed path can also be a straight or curved one.

It can be appreciated that, according to the third embodiment of the cutter path planning method in which the connection between the sub-programmed paths is of the inserted type, the distance from the intersection of the first and second programmed paths to the third transition path is equal to the radius r of the cutter, which implies that the distance from any one point on the transition path to either the first or second programmed path would be not smaller than the radius of the cutter. Thus, when the cutter is milling at the transition part, it will not go beyond the programmed path, that is, it will not cut off the part of the workpiece that should not be cut, which therefore can well solve the over-cutting issues to enable a smooth transition between the two cutter paths; in addition, the cutter path planning method is compatible with the programmed paths in a two-dimensional plane as well as a three-dimensional space, providing easy compatibility.

Figure 14:
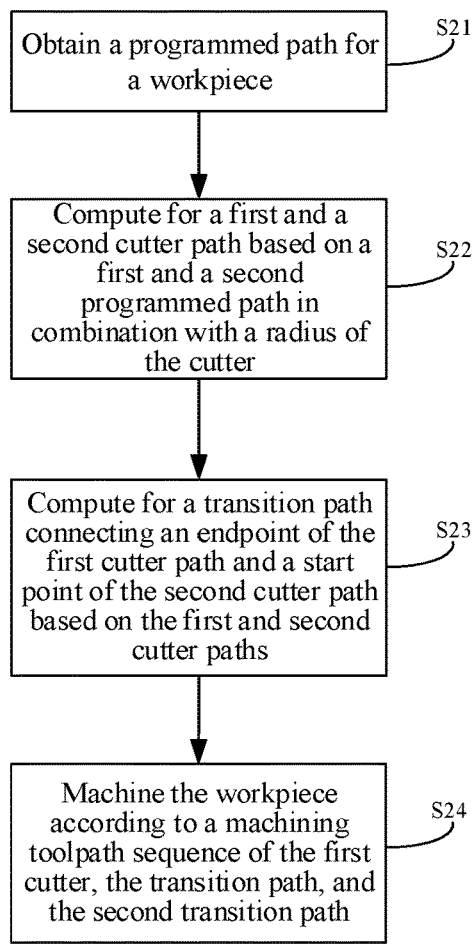
FIG. 14 is a flowchart illustrating a method for workpiece machining according to an embodiment of the disclosure.
Figure 15:
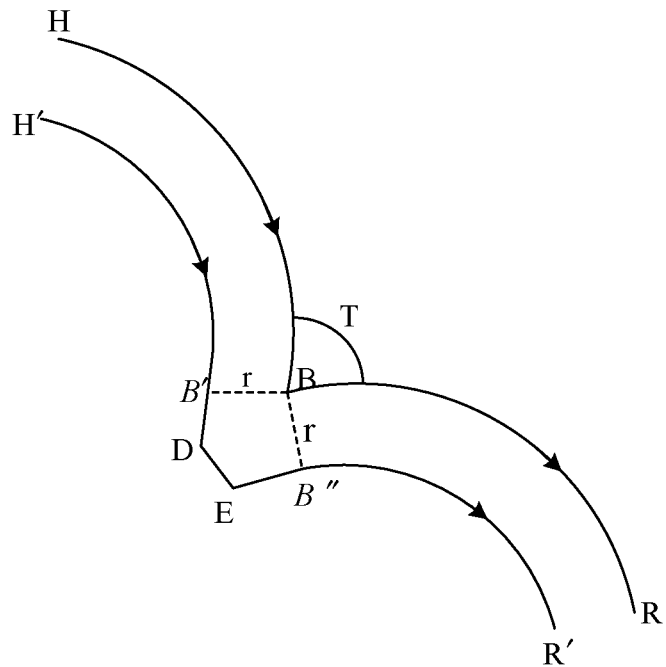
FIG. 15 illustrates the machining toolpath sequence in the workpiece machining method according to an embodiment of the disclosure.

Referring now to FIGS. 14 and 15, one embodiment of the method for workpiece machining may comprise the following steps.

In a first step S21, a programmed path for a workpiece is obtained.

The programmed path may be comprised of a first programmed path HB and a second programmed path BR connecting end to end.

In the following step S22, a first and a second cutter path are calculated based on the first and second programmed paths and a radius of the cutter.

The corresponding first cutter path H'B' can be calculated based on the first programmed path HB and the radius of the cutter, whilst the corresponding second cutter path B"R' can be calculated based on the second programmed path BR and the radius of the cutter. An intersection B of the first programmed path HB and the second programmed path BR corresponds to an end point B' of the first cutter path H'B' and a start point B" of the second cutter path B"R'. The method may then continue to step S23.

In the following step S23, the first and second cutter paths are based on to compute for a transition path connecting the end point of the first cutter path and the start point of the second cutter path.

The transition path consisted of B'D, DE, and EB" that connects the end point B' of the first cutter path H'B' and the start point B" of the second cutter path B"R' can be computed based on the first cutter path H'B' and the second cutter path B"R'. The distance from any one point on the transition path to either the first programmed path HB or the second programmed path BR would be greater than or equal to the radius r of the cutter. The method can then continue to step S24.

In the following step S24, the workpiece is milled according to a machining toolpath sequence of the first cutter path, the transition path, and the second cutter path.

Specifically, the cutter may thus machine the workpiece according to a machining toolpath sequence of the first cutter path H'B', the transition path consisted of B"D, DE, and EB", and the second cutter path B"R'.

According to the workpiece machining method of the disclosure, the programmed path for a workpiece can be first obtained, a corresponding first cutter path then can be calculated based on a first programmed path and the radius of the cutter and a corresponding second cutter path can be calculated based on a second programmed path and the radius of the cutter, further a transition path connecting the end point of the first cutter path and the start point of the second cutter path can be calculated based on the first and second cutter paths, ensuring that the distance from any one point on the transition path to either of the first and second programmed paths is not smaller than the radius of the cutter, hence the cutter can mill the workpiece according to the derived machining toolpath sequence, so that when the cutter is milling at the transition part, it will not go beyond the programmed path, that is, it will not cut away the part which should not be milled. Therefore the disclosure can well solve the over-cutting issues during the machining process, to enable a smooth transition between the two cutter paths and improve the workpiece machining quality; furthermore, the resultant transition path is relatively short, which to a certain extent can improve the machining efficiency.

Figure 16:
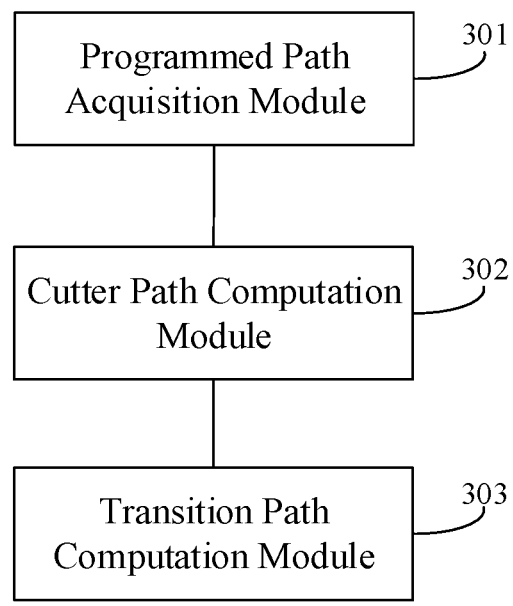
FIG. 16 is a block diagram of an apparatus for cutter path planning according to an embodiment of the disclosure.

Referring now to FIG. 16, one embodiment of an apparatus for cutter path planning according to the disclosure may comprise a programmed path acquisition module 301, a cutter path computation module 302, and a transition path computation module 303.

The programmed path acquisition module 301 may be configured to obtain a programmed path for a workpiece. The programmed path may be comprised of a first and a second programmed path connecting end to end.

The cutter path computation module 302 may be configured to compute for a corresponding first cutter path based on the first programmed path and a radius of the cutter, and for a corresponding second cutter path based on the second programmed path and the radius of the cutter. An intersection of the first and second programmed paths may correspond to an end point of the first cutter path and a start point of the second cutter path.

The transition path computation module 303 may be configured to compute for a transition path connecting the end point of the first cutter path and the start point of the second cutter path based on the first and second cutter paths. The transition path is computed as such that the distance from any one point on the transition path to either the first or second programmed path is greater than or equal to the radius of the cutter.

Figure 17:
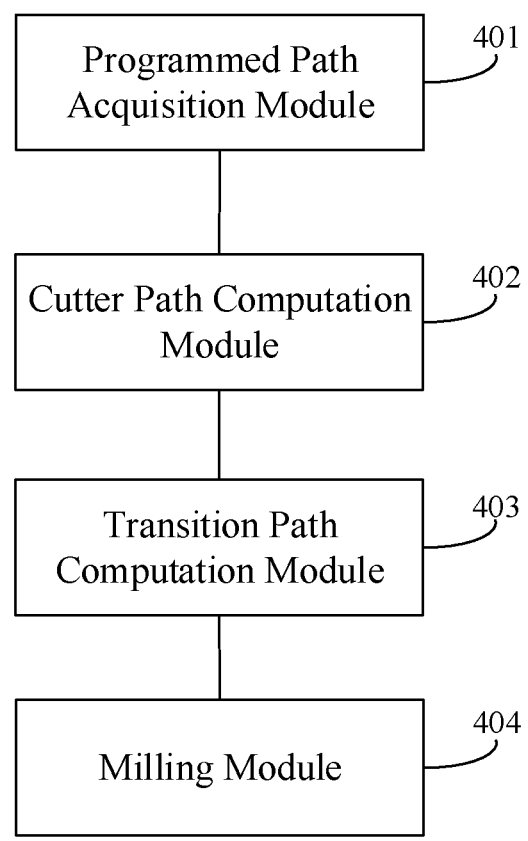
FIG. 17 is a block diagram of an apparatus for workpiece machining according to an embodiment of the disclosure.

Referring now to FIG. 17, one embodiment of an apparatus for workpiece machining may comprise a programmed path acquisition module 401, a cutter path computation module 402, a transition path computation module 403, and a milling module 404.

The programmed path acquisition module 401 may be configured to obtain a programmed path for a workpiece. The programmed path may be comprised of a first and a second programmed path connecting end to end.

The cutter path computation module 402 may be configured to compute for a corresponding first cutter path based on the first programmed path and a radius of the cutter, and for a corresponding second cutter path based on the second programmed path and the radius of the cutter. An intersection of the first and second programmed paths may correspond to an end point of the first cutter path and a start point of the second cutter path.

The transition path computation module 403 may be configured to compute for a transition path connecting the end point of the first cutter path and the start point of the second cutter path based on the first and second cutter paths. The transition path is computed as such that the distance from any one point on the transition path to either the first or second programmed path is greater than or equal to the radius of the cutter.

The milling module 404 may be configured to machine the workpiece according to the derived machining toolpath sequence of the first cutter path, the transition path, and the second cutter path.

The embodiments as described above are merely some exemplary embodiments of the disclosure. Those of skill in the art can perform various modifications to the disclosure after reading the present application without departing from the spirits and scope of the disclosure.

The invention claimed is:

1. A method for cutter path planning, comprising:
    obtaining a programmed path of a workpiece, wherein the programmed path is comprised of a first programmed path and a second programmed path connecting end to end;
    achieving a corresponding first cutter path according to the first programmed path and a radius of a cutter which is configured to mill the workpiece, and achieving a corresponding second cutter path according to the second programmed path and the radius of the cutter, wherein an intersection of the first and second programmed paths corresponds to an end point of the first cutter path and to a start point of the second cutter path; and
    achieving a transition path for connecting the end point of the first cutter path and the start point of the second cutter path according to the first and second cutter paths, wherein a distance from any one point on the transition path to either of the first and second programmed paths is greater than or equal to the radius of the cutter such that the cutter does not go beyond the programmed path when the cutter is milling the workpiece along the first cutter path, the transition path and the second cutter path.

2. The method according to claim 1, wherein the transition path is a curve.

3. The method according to claim 1, wherein the transition path is comprised of straight line segments.

4. The method according to claim 3, wherein the transition path is comprised of a first transition path, a second transition path, and a third transition path connecting end to end; wherein
when last segment of the first cutter path is curved, the first transition path is a tangent to the first cutter path at its end point; when the last segment of the first cutter path is straight, the first transition path is an extension line of the first cutter path passing through the end point,
when first segment of the second cutter path is curved, the second transition path is a tangent to the second cutter path at its start point; when the first segment of the second cutter path is straight, the second transition path is an extension line of the second cutter path passing through the start point;
wherein a first transition point is selected from the first transition path, a second transition point is selected from the second transition path, and the third transition path is a line segment connecting the first and second transition points.

5. The method according to claim 4, wherein when a connection between the first and second programmed paths is of an elongated or shortened type and the first and second programmed paths are skew lines lying in separate planes, the third transition path is substantially perpendicular both to a radius compensation direction vector $\vec{r}_1$ of a first tangent of the first cutter path at its endpoint and to a radius compensation direction vector $\vec{r}_2$ of a second tangent at its start point;
when the connection between the first and second programmed paths is of an inserted type, a length of the first transition path is equal to that of the second transition path, and a distance from an intersection of the first and second programmed paths to the third transition path is equal to the radius r of the cutter.

6. The method according to claim 5, wherein when the connection between the first and second programmed paths is of the elongated or shortened type, a first transition point D and a second transition point E on the transition path are derived as follows:

$$\begin{cases} D = B' + s*\vec{l}_1 \\ E = B'' + t*\vec{l}_2 \\ s = \dfrac{\overrightarrow{B'B''}*\vec{r}_2}{\vec{l}_1*\vec{r}_2}(\vec{l}_1*\vec{r}_2 \neq 0) \\ t = \dfrac{-\overrightarrow{B'B''}*\vec{r}_1}{\vec{l}_2*\vec{r}_1}(\vec{l}_2*\vec{r}_1 \neq 0) \end{cases}$$

wherein, $\vec{l}_1$ is a unit direction vector of the first tangent and $\vec{l}_2$ is a unit direction vector of the second tangent, B' is the endpoint of the first cutter path, and B" is the start point of the second cutter path; when $\vec{l}_1*\vec{r}_2=0$, the first transition point D is an intersection of a common perpendicular of the first and second tangents with the first tangent; and when $\vec{l}_2*\vec{r}_1=0$, the second transition point E is an intersection of the common perpendicular of the first and second tangents with the second tangent.

7. The method according to claim 5, wherein when the connection between the first and second programmed paths is of the inserted type, a first transition point D and a second transition point E on the transition path are derived as follows:

$$\begin{cases} D = B' + x*\vec{l}_1 \\ E = B'' + x*\vec{l}_2 \end{cases}$$

wherein, $\vec{l}_1$ is a unit direction vector of the first tangent, $\vec{l}_2$ is a unit direction vector of the second tangent, B' is the endpoint of the first cutter path, and B" is the start point of the second cutter path, and x is a positive solution of equation $$\left(\dfrac{B'+B''+x(\vec{l}_1+\vec{l}_2)}{2} - B\right)^2 = r^2.$$

8. A method for workpiece machining, comprising:
obtaining a programmed path of a workpiece, wherein the programmed path is comprised of a first and a second programmed path connecting end to end;
achieving a corresponding first cutter path according to the first programmed path and a radius of a cutter which is configured to mill the workpiece, and achieving a corresponding second cutter path according to the second programmed path and the radius of the cutter, wherein an intersection of the first and second programmed paths corresponds to an end point of the first cutter path and to a start point of the second cutter path;
achieving a transition path connecting the end point of the first cutter path and the start point of the second cutter path according to the first and second cutter paths, wherein a distance from any one point on the transition path to either of the first and second programmed paths is greater than or equal to the radius of the cutter;
machining the workpiece according to a machining toolpath sequence of the first cutter path, the transition path, and the second cutter path, such that the cutter does not go beyond the programmed path when the cutter is milling the workpiece along the first cutter path, the transition path and the second cutter path.

9. An apparatus for cutter path planning, comprising:
a programmed path acquisition module, configured to obtain a programmed path of a workpiece, wherein the programmed path is comprised of a first programmed path and a second programmed path connecting end to end;
a cutter path computation module, configured to achieve a corresponding first cutter path according to the first programmed path and a radius of a cutter which is configured to mill the workpiece, and achieve a corresponding second cutter path based on according to the second programmed path and the radius of the cutter, wherein an intersection of the first and second programmed paths corresponds to an end point of the first cutter path and a start point of the second cutter path; and a transition path computation module configured to achieve a transition path for connecting the end point of the first cutter path and the start point of the second cutter path according to the first and second cutter paths, wherein a distance from any one point on the transition path to either of the first and second programmed paths is greater than or equal to the radius of the cutter such that the cutter does not go beyond the programmed path when the cutter is milling the workpiece along the first cutter path, the transition path and the second cutter path.

10. An apparatus for workpiece machining, comprising:
a programmed path acquisition module, configured to obtain a programmed path of a workpiece, wherein the programmed path is comprised of a first and a second programmed path connecting end to end;
a cutter path computation module, configured to achieve a corresponding first cutter path according to the first programmed path and a radius of a cutter which is configured to mill the workpiece, and achieve a corresponding second cutter path according to the second programmed path and the radius of the cutter, wherein an intersection of the first and second programmed paths corresponds to an end point of the first cutter path and a start point of the second cutter path;
a transition path computation module, configured to achieve a transition path for connecting the end point of the first cutter path and the start point of the second cutter path according to the first and second cutter paths, wherein a distance from any one point on the transition path to either of the first and second programmed paths is greater than or equal to the radius of the cutter; and
a milling module, configured to machine the workpiece according to a machining toolpath sequence of the first cutter path, the transition path, and the second cutter path such that the cutter does not go beyond the programmed path when the cutter is milling the workpiece along the first cutter path, the transition path and the second cutter path.

11. The apparatus according to claim 9, wherein when a connection between the first and second programmed paths is of an elongated or shortened type, the cutter path computation module is configured to offset rightward by one radius of the cutter along a forward direction of the first and second programmed paths respectively to obtain the first and second cutter paths.

12. The apparatus according to claim 9, wherein when a connection between the first and second programmed paths is of an inserted type, the cutter path computation module is configured to offset leftward by one radius of the cutter along a forward direction of the first and second programmed paths respectively to obtain the first and second cutter paths.

13. The method according to claim 8, wherein when a connection between the first and second programmed paths is of an elongated or shortened type, the step of achieving the corresponding first and second cutter paths based on the first and second programmed paths in combination with the radius of the cutter comprises:
offsetting rightward by one radius of the cutter along a forward direction of the first and second programmed paths respectively to obtain the first and second cutter paths.

14. The method according to claim 8, wherein when a connection between the first and second programmed paths is of an inserted type, the step of achieving the corresponding first and second cutter paths based on the first and second programmed paths in combination with the radius of the cutter comprises:
offsetting leftward by one radius of the cutter along a forward direction of the first and second programmed paths respectively to obtain the first and second cutter paths.

15. The method according to claim 8, wherein the transition path is comprised of a first transition path, a second transition path, and a third transition path connecting end to end; wherein
when last segment of the first cutter path is curved, the first transition path is a tangent to the first cutter path at its end point; when the last segment of the first cutter path is straight, the first transition path is an extension line of the first cutter path passing through the end point;
when first segment of the second cutter path is curved, the second transition path is a tangent to the second cutter path at its start point; when the first segment of the second cutter path is straight, the second transition path is an extension line of the second cutter path passing through the start point;
wherein a first transition point is selected from the first transition path, a second transition point is selected from the second transition path, and the third transition path is a line segment connecting the first and second transition points.

16. The method according to claim 15, wherein when a connection between the first and second programmed paths is of an elongated or shortened type and the first and second programmed paths are skew lines lying in separate planes, the third transition path is perpendicular both to a radius compensation direction vector $\vec{r}_1$ of a first tangent of the first cutter path at its endpoint and to a radius compensation direction vector $\vec{r}_2$ of a second tangent at its start point;
when the connection between the first and second programmed paths is of an inserted type, a length of the first transition path is equal to that of the second transition path, and a distance from an intersection of the first and second programmed paths to the third transition path is equal to the radius r of the cutter.

17. The apparatus according to claim 10, wherein when a connection between the first and second programmed paths is of an elongated or shortened type, the cutter path computation module is configured to offset rightward by one radius of the cutter along a forward direction of the first and second programmed paths respectively to obtain the first and second cutter paths.

18. The apparatus according to claim 10, wherein when a connection between the first and second programmed paths is of an inserted type, the cutter path computation module is configured to offset leftward by one radius of the cutter along a forward direction of the first and second programmed paths respectively to obtain the first and second cutter paths.

19. The method according to claim 1, wherein when a connection between the first and second programmed paths is of an elongated or shortened type, the step of achieving the corresponding first and second cutter paths based on the first and second programmed paths in combination with the radius of the cutter comprises:
offsetting rightward by one radius of the cutter along a forward direction of the first and second programmed paths respectively to obtain the first and second cutter paths.

20. The method according to claim 1, wherein when a connection between the first and second programmed paths is of an inserted type, the step of achieving the corresponding first and second cutter paths based on the first and second programmed paths in combination with the radius of the cutter comprises:

offsetting leftward by one radius of the cutter along a forward direction of the first and second programmed paths respectively to obtain the first and second cutter paths.

* * * * *